Feb. 24, 1942. S. KRAMER Re. 22,036

WATCHCASE

Original Filed June 7, 1939

INVENTOR.
Samuel Kramer.

BY Blair & Brutsfield

ATTORNEYS.

Reissued Feb. 24, 1942

Re. 22,036

UNITED STATES PATENT OFFICE 22,036

WATCHCASE

Samuel Kramer, New York, N. Y., assignor to Pioneer Watch Case Co., Inc., Mount Vernon, N. Y., a corporation of New York Original No. 2,229,979, dated January 28, 1941, Serial No. 277,793, June 7, 1939. Application for reissue June 14, 1941, Serial No. 398,169

6 Claims. (Cl. 58—90)

This invention relates generally to watchcases. More particularly it relates to watchcases that are so constructed as to exclude foreign matter such as moisture, dust and dirt from the interior of the watchcase, and cases of which type will hereinafter be referred to as water tight watchcases.

The general object of my invention is the provision of a watchcase that is simple and inexpensive and is adapted to exclude foreign matter from the interior thereof.

Among the more particular objects of my invention is the provision in a watchcase comprising a plurality of parts of a construction whereby all joints between the parts thereof are rendered water tight, and whereby all foreign matter such as fluids, dirt, dust, grit and the like will be effectively excluded from the interior of the watchcase.

It is also among the more particular objects of my invention to provide a watertight construction for a watchcase in which tightness is secured by providing extensive angularly related contact areas at the contacting portions of the parts forming the joint.

Among the more particular objects of my invention is further the provision in a watchcase of a water tight construction that is applicable to existing types and forms of watchcases without materially altering their contours.

These objects and such other objects as will hereinafter appear to be pointed out are attained in the illustrative embodiment of my invention shown in the drawing, in which.

Figure 1:
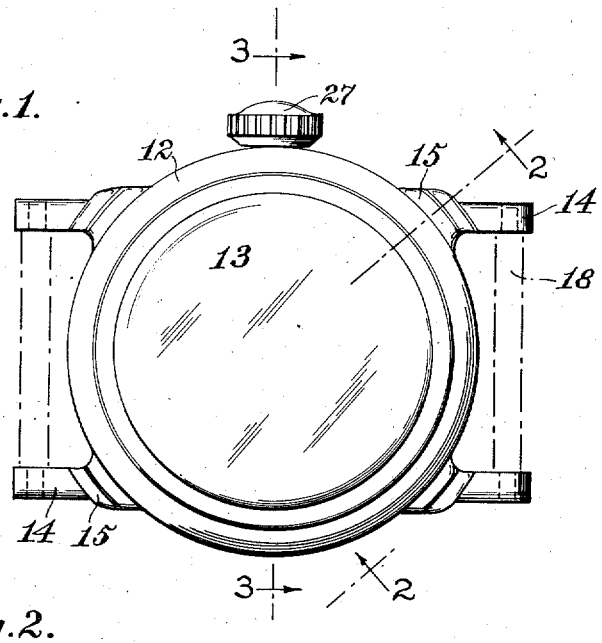
Figure 1 is a plan view of one form of my improved watchcase.
Figure 2:
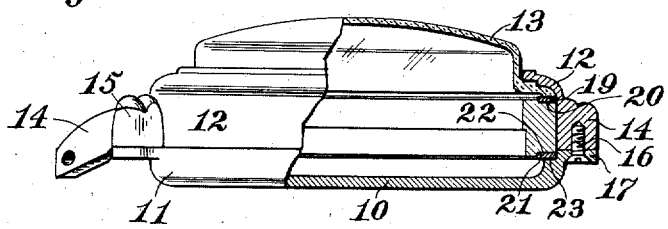
Figure 2 is a side elevation thereof with a portion broken away substantially on the line 2—2 of Figure 1 looking in the direction of the arrows.

Referring now to the drawing in detail, which illustrates my invention as applied to a wrist watchcase, although obviously it is not restricted to this type of watchcase, I have therein shown at 10 an annular member or ring such as the movement ring of a watchcase that is adapted to receive the movement of a watch, while at 11 is shown the back of the case and at 12 the bezel, between which and the ring is carried the crystal 13. Extending from the bezel 12 are a plurality of lugs 14, the root portions 15 of which are reinforced and serve for the reception of screws 16 which pass through the lugs 17 provided on the rim portions of the back 11 and serve to draw the back 11 toward the bezel 12. The lugs 14 also serve for the support of bars or pins 18 to which a wrist watch strap may be secured, these bars or pins being indicated in dot and dash lines in Figure 1.

The bezel 12 and the back 11 clamp between them the annular member or ring 10 and the crystal 13, the latter being superposed on the former, and intermediate the crystal and the ring is a gasket 19 seating within an annular groove 20 on the ring and adapted to make the joint between the crystal, and the ring water tight. For this purpose the gasket 19 is made of a material that is impervious to moisture and one that, when compressed between the ring 10 and the crystal 13 will provide the desired water tight joint. Any suitable or preferred material may be used for this purpose. As examples I may mention leather and rubber, the latter in particular having the additional desirable property of resiliency.

Between the back 11 and the lower portion of the ring a second gasket 21 seating in a recess 22 on the ring and a recess 23 on the back is provided. This gasket effects a water tight joint between the ring 10 and the back 11, and as will be obvious, the requirements for the material thereof are similar to those enumerated in connection with the gasket 19.

It will be observed that by reason of the seating of the gaskets in recesses, the areas of contact are greatly increased and the seepage of water correspondingly reduced. Not merely is the contact area increased, but portions thereof are angularly related along any path that the water may take. The result is a degree of waterproofing not hitherto attainable.

In addition it will be observed that the wall of the bezel 14 is in such close contact with the gasket 19 that as the latter is compressed it will expand against the bezel wall, and the same is true of the outer wall of the recess 23 in relation to the gasket 21.

The construction so far described guards against the entry of foreign matter at all places except at the stem portion and the arrangement by which foreign matter is excluded at this point will now be described.

At 24 I have shown a bushing provided with an enlarged head 25 and secured within a bore 24a provided in the side of the casing, as by a threaded extension 26 adapted to screw into bore 24a of the ring 10. The crown 27 is made hollow so that it can seat slidably on the head 25 and is provided with a central stud 28 that is adapted to extend into the bore of the bushing 24 and has a threaded bore 29 therewithin adapted to receive the stem of the watch movement. Intermediate the stud 28 and the bore of the bushing 24 I have provided means, such as the packing 30 for preventing the passage of foreign matter.

Figure 3:
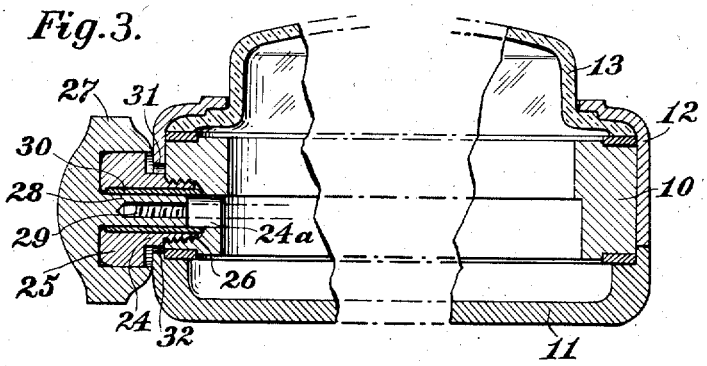
Figure 3 is a sectional view substantially on the line 3—3 of Figure 1 looking in the direction of the arrows.

In order to permit of the passage of the bushing through the bezel 12 and the back 11, these are shown cut away, respectively at 31 and 32, without thereby destroying the water tightness of the construction at this point, as can be seen from Figure 3.

It will be observed that the parts just described provide an effective construction for preventing the entry of foreign matter at the stem portion of the watch. Since the joint between the extension 26 and the movement ring is water tight, such foreign matter must first of all enter between the head 25 and the crown 27 and thereafter must work its way between the packing 30 and the stud 28 or between the packing and the bushing 24 and it is only under the most unusual conditions that any type of foreign matter whether solid or fluid can find its way into the interior of the watchcase.

While I have shown my invention as applied to a circularly contoured watchcase, it will be obvious that it is applicable to all the other contours now in common use, and to many other contours. It is therefore to be understood that I do not intend to restrict myself to watchcases of circular contour. Nor do I intend to restrict myself to the various phases of my invention in the exact combination shown. As will be obvious they can be used in other combinations.

While I have herein described one illustrative embodiment of my invention it will be understood that the same may be embodied in many other forms without departing from the spirit thereof as will be obvious to those skilled in the art, and that the disclosure herein is by way of illustration merely and is not to be interpreted in a limiting sense and that I do not limit myself other than as called for by the prior art.

Having thus described my invention and illustrated its use, what I claim as new and desire to secure by Letters Patent is:

1. A watchcase comprising a movement ring, a bezel having a bore adapted to receive said movement ring in close engagement, an annular recess in the upper peripheral portion of said ring, an annular recess in the lower peripheral portion of said ring, a back provided with a recess complementary to said last recess and having an outer wall portion in the form of a flange closely engaging the periphery of said movement ring, and a gasket seated in each of the recesses of said ring, a crystal having peripheral portions extending between the bezel and the upper gasket, and means for drawing said bezel and said back together, whereby said gaskets will be compressed and will effect a watertight joint between said ring on the one hand, and the crystal, the bezel and the back on the other hand.

2. In combination in a watchcase, a movement ring, a bezel having a bore to receive said movement ring in relatively close engagement, a recess running around the upper peripheral portion of said ring, a compressible gasket seated in said ring, a crystal having peripheral portions extending between the bezel and the gasket, and means for drawing said bezel against said crystal, whereby said crystal will press against said gasket and will compress it axially and expand it radially so as to cause its peripheral portions to press against the wall of the bore in said bezel, and to effect a watertight joint between said ring on the one hand and said crystal and said bezel on the other hand.

3. In combination in a watchcase, a circularly contoured movement ring, a back having a peripheral wall of an inner diameter to receive a portion of the movement ring, an annular recess in the end of said movement ring, a compressible gasket seated in said recess, said gasket being of a diameter to engage the inner surface of said peripheral wall of the back, and means to press said back against said gasket, whereby said gasket will be axially compressed and its peripheral portions will expand radially and press against the inner surface of said peripheral wall so as to make a watertight joint.

4. A watchcase comprising a ring, a bezel having a bore adapted to receive said ring in close engagement, an annular recess in the upper peripheral portion of said ring, an annular recess in the lower peripheral portion of said ring, a back provided with a recess complementary to said last recess and having an outer wall portion in the form of a flange closely engaging the periphery of said ring, and a gasket seated in each of the recesses of said ring, a crystal having peripheral portions extending between the bezel and the upper gasket, and means for drawing said bezel and said back together, whereby said gaskets will be compressed and will effect a watertight joint between said ring on the one hand, and the crystal, the bezel and the back on the other hand.

5. In combination in a watchcase, a ring, a bezel having a bore to receive said ring in relatively close engagement, a recess running around the upper peripheral portion of said ring, a compressible gasket seated in said ring, a crystal having peripheral portions extending between the bezel and the gasket, and means for drawing said bezel against said crystal, whereby said crystal will press against said gasket and will compress it axially and expand it radially so as to cause its peripheral portions to press against the wall of the bore in said bezel, and to effect a watertight joint between said ring on the one hand and said crystal and said bezel on the other hand.

6. In combination in a watchcase, a circularly contoured ring, a back having a peripheral wall of an inner diameter to receive a portion of the ring, an annular recess in the end of said ring, a compressible gasket seated in said recess, said gasket being of a diameter to engage the inner surface of said peripheral wall of the back, and means to press said back against said gasket, whereby said gasket will be axially compressed and its peripheral portions will expand radially and press against the inner surface of said peripheral wall so as to make a watertight joint.

SAMUEL KRAMER.